United States Patent [19]
Ricci

[11] Patent Number: 5,847,661
[45] Date of Patent: Dec. 8, 1998

[54] VEHICLE DATA ACQUISITION SYSTEM

[75] Inventor: Christopher P. Ricci, Pembroke, Mass.

[73] Assignee: Intelligent Ideation, Inc., Amesbury, Mass.

[21] Appl. No.: 616,261

[22] Filed: Mar. 15, 1996

[51] Int. Cl.⁶ ........................................... G08B 1/00
[52] U.S. Cl. .................... 340/902; 340/447; 340/825.54; 340/825.72
[58] Field of Search .................... 340/905, 901, 340/902, 906, 438, 825.69, 825.72, 435, 903, 426, 447, 572, 825.54; 455/54.1, 53.1; 364/424.03, 424.04

[56] References Cited

U.S. PATENT DOCUMENTS

| | | | |
|---|---|---|---|
| 4,443,790 | 4/1984 | Bishop | 340/539 |
| 4,591,823 | 5/1986 | Horvat | 340/905 |
| 4,742,357 | 5/1988 | Rackley | 342/457 |
| 4,747,064 | 5/1988 | Johnston | 340/902 |
| 4,816,827 | 3/1989 | Baloutch et al. | 340/905 |
| 4,835,524 | 5/1989 | Lamond et al. | 340/572 |
| 5,053,774 | 10/1991 | Schuermann et al. | 342/44 |
| 5,059,951 | 10/1991 | Kaltner | 340/572 |
| 5,126,745 | 6/1992 | Steinhagen et al. | 342/51 |
| 5,227,740 | 7/1993 | Steinhagen et al. | 331/166 |
| 5,317,309 | 5/1994 | Vercellotti et al. | 340/825.54 |
| 5,400,031 | 3/1995 | Fitts | 342/36 |
| 5,451,758 | 9/1995 | Jesadanont | 340/928 |
| 5,546,311 | 8/1996 | Sekine | 364/449 |

FOREIGN PATENT DOCUMENTS 4411125  4/1993  Netherlands .

OTHER PUBLICATIONS

"Shielding Effectiveness of Metallic Sheets"; pp. 137–140.
"Chapter 2, Fundamentals of Radiowave Propagation"; Radiowave Propagation In Satellite Communications; pp. 12–15.
Ulrich Kaiser and Wolfgang Steinhagen; "A Low Power Transponder IC for High Performance Identification Systems"; 1994; IEEE; pp. 335–338.
Rolando R. Buted; "Zero Bias Detector Diodes for the RF/ID Market"; Dec. 1995; Hewlett–Packard Journal; pp. 94–98.

*Primary Examiner*—Jeffery A. Hofsass
*Assistant Examiner*—Julie Lieu
*Attorney, Agent, or Firm*—Christopher P. Ricci

[57] ABSTRACT

A data acquisition system is disclosed where a first communication device transmits a transmitted signal to a second communication device. The second communication device encodes the transmitted signal with a code generating a retransmitted signal. The retransmitted signal is then transmitted back to the first communication device. The code can be indicative of an environmental element, such as a traffic sign. The first communication device can determine a distance to the environmental element by monitoring a time for the retransmitted signal to arrive. The first communication device can also encode the transmitted signal with information, such as voice for example.

1 Claim, 8 Drawing Sheets

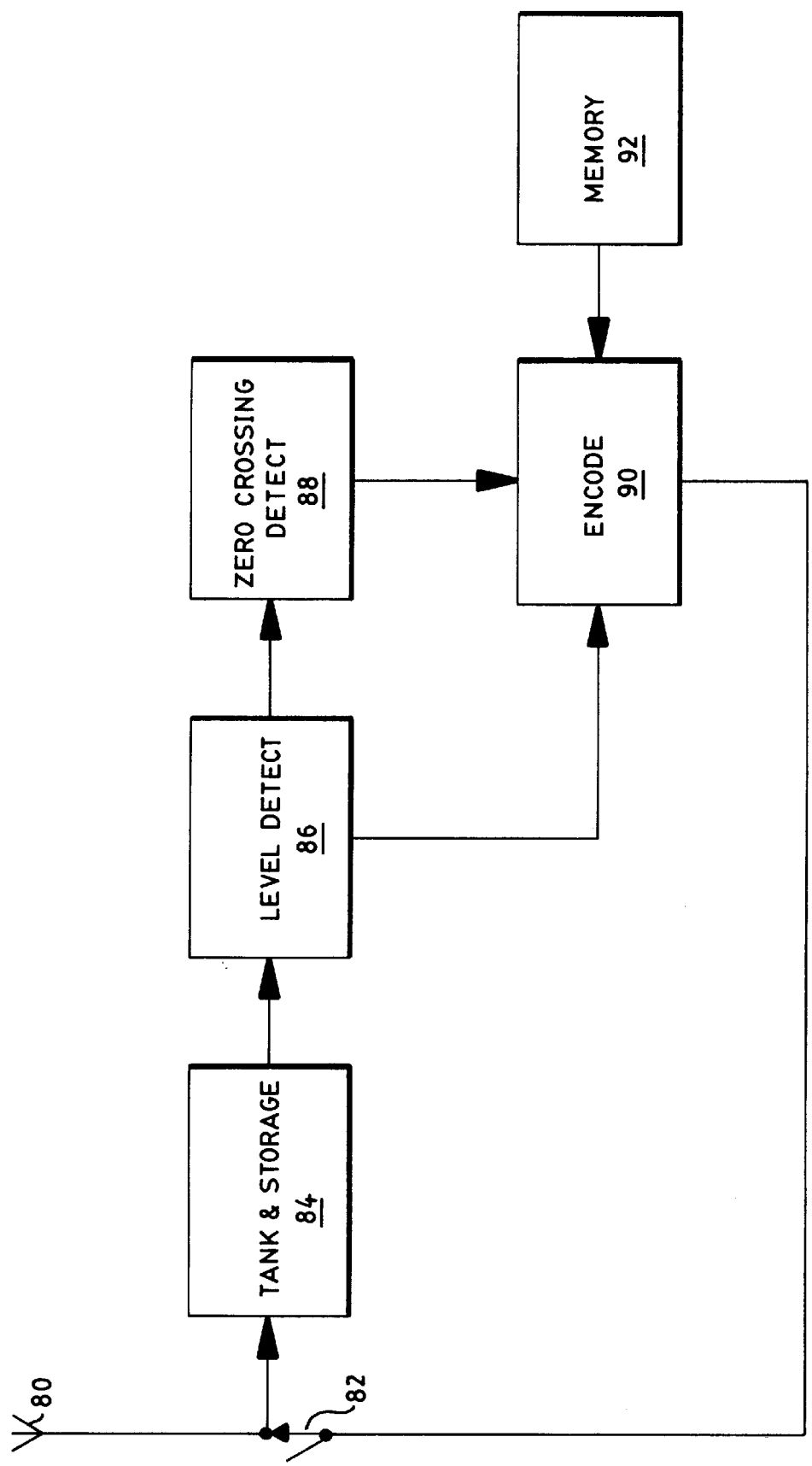

VEHICLE DATA ACQUISITION SYSTEM

BACKGROUND OF THE INVENTION

The present invention relates generally to data acquisition systems, and, more particularly, the invention relates to data acquisition systems having passive components for transmitting information relating to a vehicle's environment.

Data acquisition systems are currently available that rely on external sources to provide environmental information. For example, navigation systems for vehicles, such as boats and automobiles, rely on the global positioning system ("GPS") to provide precise longitudinal and latitudinal information. This information can be used by an on-board computer programmed with environment software, such as with maps and charts of the area, to help navigate the vehicle. A problem with such systems is the cost. The transponder necessary to communicate with the satellite network is expensive, thus making such systems impractical under ordinary circumstances.

Another problem is that the location information is only as useful as the environment software programmed into the on-board computer. If the environment software is incomplete or changes then the location information has only limited usefulness. Further, the level of detail for any particular area can also be very limited. And, if the environment software is updated then each vehicle using such software must also be updated or risk having outdated information.

Some automobile navigation systems also include traffic control functions which attempt to optically determine the environment by reading traffic or street signs and watching lines on roads. These systems are limited by optical conditions though. If weather is bad or a headlight on the automobile goes out, then the navigation system has the same problems reading the environment as does the operator.

Vehicle data acquisition is not limited to navigation and traffic control systems. The environment for a vehicle can also include being aware of other vehicles in the area. For this limited function, radar or other mass detection systems could be used but, again, at great expense. Further, such systems give no information as to a type of vehicle. For example, commercially available mass detection systems can not detect whether the vehicle behind the transmitting vehicle is an emergency vehicle.

Intervehicular communication can also be helpful when an emergency vehicle is in the vicinity. Often, an operator does not notice the emergency vehicle, for example, an ambulance approaching an intersection perpendicular to that being traveled by the operator. Numerous intervehicular communication devices are available, such as citizen band radio for example, which would allow the ambulance to contact cars to warns them of its approach. A problem with such intervehicular communication is that these systems must be separately purchased and installed in cars. Also, the intervehicular communications in use today have long ranges which means that every warning from an emergency vehicle must be prefaced by location information or the car will not know whether the emergency broadcast is directed toward it. Also, if the emergency vehicle is a police car commanding the operator to pull the car to the side of the road, there is currently no mechanism for forcing the car over if the operator resists, short of chasing the car in extremely dangerous chases.

Accordingly, it is an object of this invention to provide a vehicular data acquisition system that provides navigation information, traffic control information, and intervehicular communication.

It is another object of this invention to provide a navigation system that is less affected by weather conditions.

It is still another object of the invention to provide a data acquisition system that provides information relating to area vehicles.

It is a further object of the invention to provide a data acquisition system that provides intervehicular communication.

It is a further object of the invention to provide an intervehicular communication system that allows remote control of one vehicle by another vehicle.

These and other objects of the invention will be obvious and will appear hereinafter.

SUMMARY

The aforementioned and other objects are achieved by the invention which provides, in one aspect, a data acquisition system. The invention provides an extremely versatile system for navigating and controlling a vehicle as determined by the environment of the vehicle. The system comprises a transmission means, a transponder means and a reception means.

The transmission means is disposed in the vehicle for periodically transmitting a carrier signal. The carrier signal can have identification information encoded thereon to identify a source of the transmission. Such information is necessary if a goal of the system is to determine such things as distance. For example, if the carrier is transmitted and returned indicating the car is approaching a stop sign then a distance to the sign could be important. Therefore, identification information is used to know whether the car is the originator of the carrier and when it originated. A distance can then be computed.

When a transponder means is within a predetermined range of the vehicle transmitting the carrier, the transponder means encodes on the carrier a code representative of environmental information. Continuing the above example, if the transponder means is located on a stop sign, a code is placed on the carrier signal which is indicative to a car that it is approaching a stop sign. Such code is a predetermined set of numeric codes known by the vehicle. Thus, the carrier encoded with a decimal code "100" could be a stop sign. Codes need not be fixed. A traffic signal can transmit a different code depending on whether the traffic signal is a red light or a green light. Further, codes can spell signs having location specific information or non-traditional messages, street signs, direction signs, or temporary conditions, for example.

One code designates voice transmission. When this code is encountered, the data that follows the code is a digital representation of a voice signal, thereby providing intervehicular communication.

The vehicle then receives the coded carrier signal in the reception means. The reception means deciphers the code to determine the message relating to the environment. Depending upon the implementation, the message can then be displayed, it can be audibly interjected into the vehicle's sound system, or it can be used to actually control the vehicle.

In further aspects, the invention provides methods in accord with the apparatus described above. The aforementioned and other aspects of the invention are evident in the drawings and in the description that follows.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 4 shows a block diagram of a transponder in accordance with the invention as shown in FIG. 1;

DETAILED DESCRIPTION

While the present invention retains utility within a wide variety of control and data acquisition systems and may be embodied in several different forms, it is advantageously employed in connection with an automobile, or other vehicle such as a boat, for example. Though this is the form of the illustrated embodiment and will be described as such, this embodiment should be considered illustrative and not restrictive.

Figure 1:
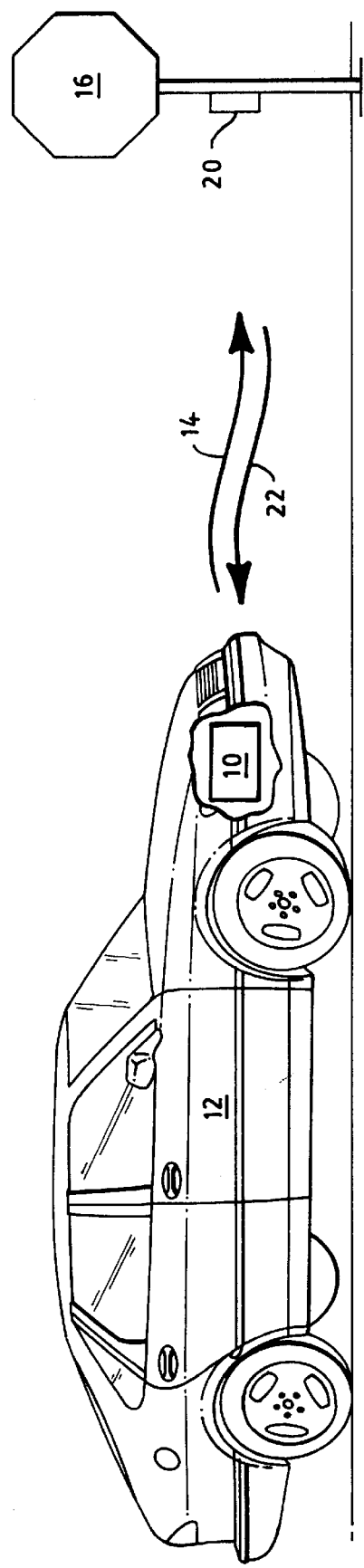
FIG. 1 shows a block diagram of an automobile using a data acquisition system in accordance with the invention.

FIG. 1 shows a first embodiment of the invention where an automobile 12 remotely ascertains traffic information. An interrogator unit 10 disposed in the automobile 12 transmits a transmitted signal 14. The transmitted signal 14 is a carrier signal which is optionally encoded before transmission with source identification information, inter alia. The carrier signal is generally a radio frequency ("RF") wave which, in the preferred embodiment, oscillates at a center frequency of approximately 920 MHz. This high frequency has the advantages of high data rate allowing for redundancy, error detection, distance computation, information exchange, and voice communication. Also, in the case of a passive transponder 20, high power density at higher frequencies provide faster charging of the transponder energy storage circuitry, a capacitor for example. This is due to the fact that power is proportional to frequency as is shown by the following relationship:

$$P = C * v^2 * f$$

where

P—power

C—capacitance

V—voltage f—frequency

One skilled in the art will realize that other frequencies can be used and that noise reduction techniques, such as frequency hopping using spread spectrum, can be used to avoid interference with other transmissions in this band.

The transmitted signal 14 is broadcast periodically. In the preferred embodiment, the transmitted signal 14 is broadcast once every one hundred milliseconds, or ten times per second. When a transponder 20, which is attached to a traffic sign 16 in this example, is within the range of the interrogator 10 then the transponder 20 accepts the transmitted signal 14, encodes the transmitted signal 14 with information, and transmits a retransmitted signal 22 back to the interrogator 10.

The transponder 20 encodes the transmitted signal 14 with a code indicating a type of traffic sign 16 to which the transponder 20 is attached. The interrogator 10 contains a database having the correlation of the codes to the traffic signs. For example, a code "1100" could indicate "STOP" while "1101" could indicate "YIELD." For instructional signs, street signs, or other more textual signs, codes for alphanumeric characters are also available to spell words and numbers. One skilled in the art will realize that though the illustrated example is of a single traffic sign, multiple transponders can be located in the area of the car which are substantially simultaneously interrogated such that the car 12 can have a complete knowledge of the environment.

In another embodiment, the code includes geographical coordinates of the sign location or another code indicative of sign location. The car 12 could then work with a map stored on-line or removably stored on media such as CD-ROM, for example. Each transponder, or a selected subset of transponders, would then assist in navigation by indicating a map location to a user of the car 12. The selected subset of transponders may be selected according to established criteria, one sign every one hundred meters for example, or by type of transponder, all transponders indicative of road delineation, for example.

Figure 2:
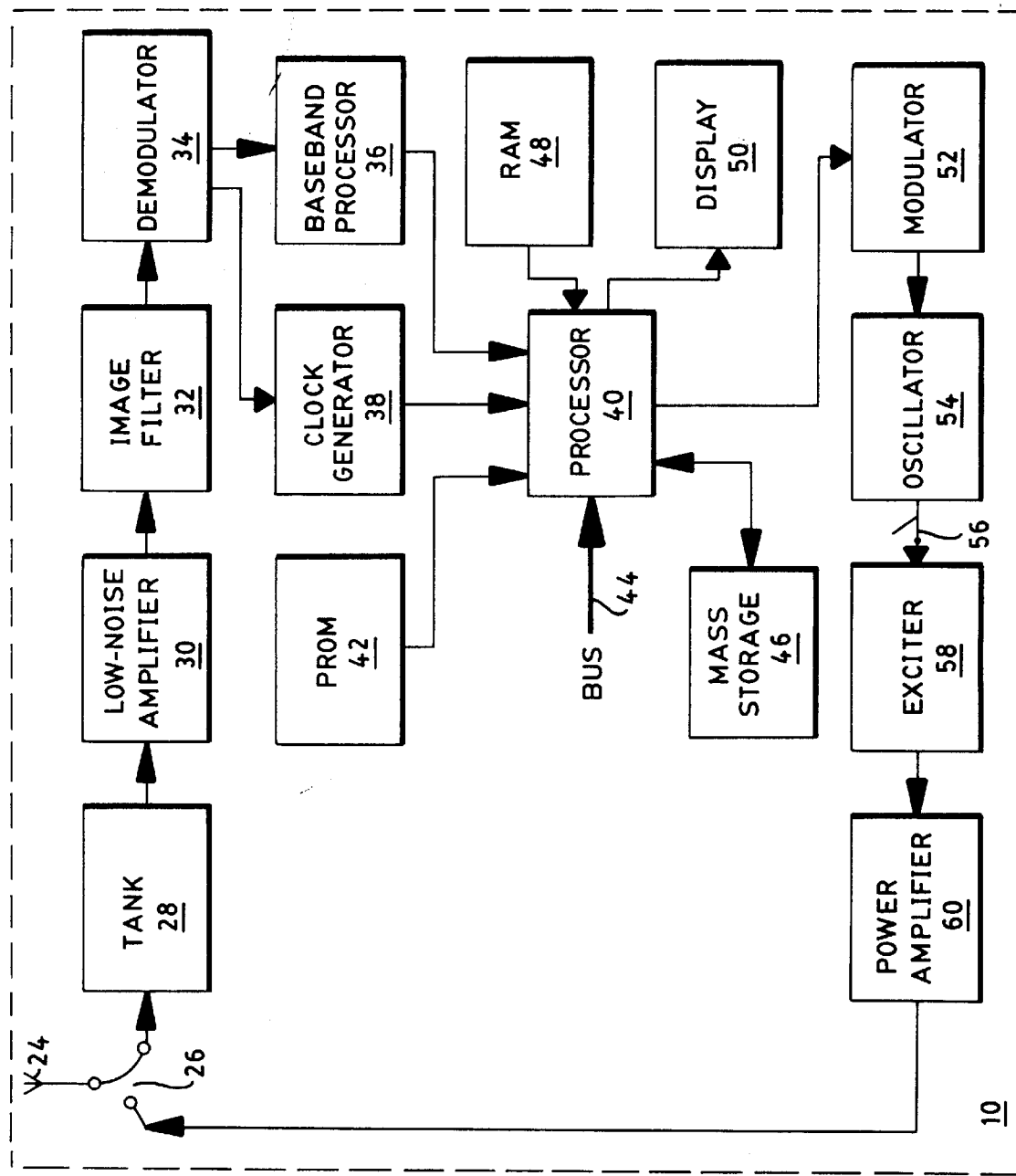
FIG. 2 shows a block diagram of an interrogator unit in accordance with the invention as shown in FIG. 1.

FIG. 2 shows a block diagram of the interrogator 10 which is disposed in the car 12. A single antenna 24 is used in this embodiment and a switch 26 is used to move the interrogator 10 between transmitting and receiving modes. In an alternative embodiment, the switch 26 is removed and a separate antenna receiving at a different frequency is used such that the interrogator can continuously transmit and receive.

The interrogator is shown with the switch 26 in the receive mode such the transmitted signal 14 comes in through the antenna 24 to a tank circuit 28. The tank circuit 28 is a selectivity filter which determines a resonant frequency for the circuit. In the illustrated case, a single frequency is used and the interrogator switches between transmitting and receiving mode. In an alternative embodiment where the interrogator transmits and receive simultaneously, the transmitted signal 14 is transmitted at one frequency and the retransmitted signal 22 is transmitted at a second frequency so that the transmitted signal 14 and the retransmitted signal 22 do not interfere with each other. In the preferred embodiment, the tank circuit is a high Q circuit tuned to resonate at the RF center frequency.

The signal having the resonant frequency of the tank circuit 28 is then passed to a low-noise amplifier 30. The low-noise amplifier 30 amplifies the signal while minimizing additional noise.

The amplified signal is passed to an image filter 32 which is a band-pass filter used to reject signals, vibrations, or radiation of certain frequencies while passing a predetermined frequency band. This increases the signal-to-noise ratio.

The output of the image filter 32 goes to a demodulator 34 which removes encoded information therefrom. The encoding used in the preferred embodiment is phase shift keying as will be described in greater detail hereinafter. The demodulator strips the encoding from the carrier signal, discards the carrier signal and retains the encoding as an encoded signal.

The encoded signal is then passed to a clock generator 38 and a baseband processor 36. The clock generator simply generates a clock pulse each time a new cycle in the encoded signal begins. In the case of modulation frequencies that are in excess of the clock speed of the processor 36, the frequency is stepped down. The base band processor 36 translates each cycle of the encoded signal into a corresponding digital value, i.e., '0' or '1'.

One skilled in the art will realize that the functionality of the baseband processor 36 is not necessarily a microprocessor. The functionality can be attained using other circuitry. In the preferred embodiment, the functionality is attained using an application specific integrated circuit ("ASIC").

In one embodiment of the invention, the baseband processor 36 also performs error correction and ensures that a valid packet has been received. These two tasks can take any of multiple forms. In the preferred embodiment, packet validity is ensured by checking a preamble and post-amble in the packet. That is, each packet starts and ends with a predefined sequence of bits. Error correction is performed by redundantly transmitting each bit and interlacing the transmission with a predetermined sequence of bits.

The digital values are transmitted to a processor 40 which accepts a new digital value on each clock pulse from the clock generator 38. The processor 40 examines the digital values and groups the digital values as binary codes. In the preferred embodiment, the binary codes are ten bits each. A database of code values and their correspondence to traffic instructions or alphanumeric characters are stored in a programmable, read-only memory ("PROM") 42.

The random access memory ("RAM") 48 is shown as temporary data storage used by the processor 40.

The traffic instructions are then displayed to a user via a display 50. In the preferred embodiment, the display 50 is a liquid-crystal display ("LCD") or a vacuum fluorescent display. The display 50 can also be an audible computer generated or recorded voice, or other such information conveyancing device well known in the art. In the case of recorded voice messages, the messages would be stored on a mass storage device 46, such as a magnetic media hard disk, and would be addressed with information stored in the aforementioned database.

The mass storage device can also be used to record historical information. For example, the interrogator can store traffic data related to roads traveled such that dependence upon transponder is minimized. If a car 12 often travels the same roads, the interrogator can store speed limits, inter alia, such that information is displayed to the user faster. Another use for historical data is as a "Black Box" analogous to those used on aircraft. In the case of a collision, data related to the car and traffic conditions are recorded for later analysis.

The interrogator 10 continuously initiates new carrier signals on which the aforementioned encoding and subsequent decoding occurs. The transmitted signal 14 is a carrier signal which is an oscillation that is optionally encoded. The encoding on the transmitted signal 14 in the preferred embodiment, at minimum, indicates a source of transmission and a transmission code. The transmission code is either a time stamp or a code that is related in an internal database with a time stamp of transmission. In this way, distance to the transponder can be approximated by monitoring an amount of time for the transmitted signal 14 to be repeated by the transponder 20 and returned. The time for the round trip, minus a substantially constant transponder encoding time, is approximately proportional to a distance to the transponder. Thus, the car 12 will know not only that there is a stop sign ahead but a distance to that stop sign, for example.

This also enables the interrogator 10 to estimate vehicle speed. By knowing distance to an object at one time, and distance to the same object at a later time, an average speed can be calculated. The speed can be indicated to the operator of the vehicle or included in the transmission signal 14 for law enforcement purposes. An example of how this is used is in a boat where water currents affect traditional speedometers, the speed indicated by the interrogator 10 with respect to a buoy would be far more accurate.

A data bus 44 is also provided for interaction with the interrogator 10 such that additional information can be encoded on the transmitted signal 14. The interaction can provide static inputs or dynamic inputs. The static input can, in turn, be a direct input or a programmable input which is stored locally in RAM or on the mass storage device 46. An example of a static, direct input is a speedometer reading from the car's speedometer. An example of a static, programmable input is a registration number. A registration number for the car will change each time ownership of the car is changed and is, therefore, programmable. Such programming can be done through input devices such as a keyboard, a pointing device, or other such input device.

The dynamic input is an input that changes and is not stored. An example is an outgoing message which is to be transmitted to another vehicle or other receiving station as is later herein described. In this case, an alphanumeric or voice message is input through the bus 44 by a keyboard, microphone, or pointing device.

The information to be encoded onto the transmitted signal 14 is sent from the processor 40 to a modulator 52. The modulator 52 synthesizes a modulation signal indicative of the information.

The modulation signal is then sent to an oscillator which generates a carrier wave mixed with the modulation signal to create the transmitted signal 14.

Optionally, a band pass filter may be inserted at this point to clean the transmitted signal 14.

The transmitted signal 14 is then passed to an exciter 58 which preamplifies the signals to provide sufficient drive for the power amplifier 60.

The exciter 58 drives a power amplifier 60 which amplifies the transmitted signal 14 for transmission out through the antenna 24.

Figure 3A:
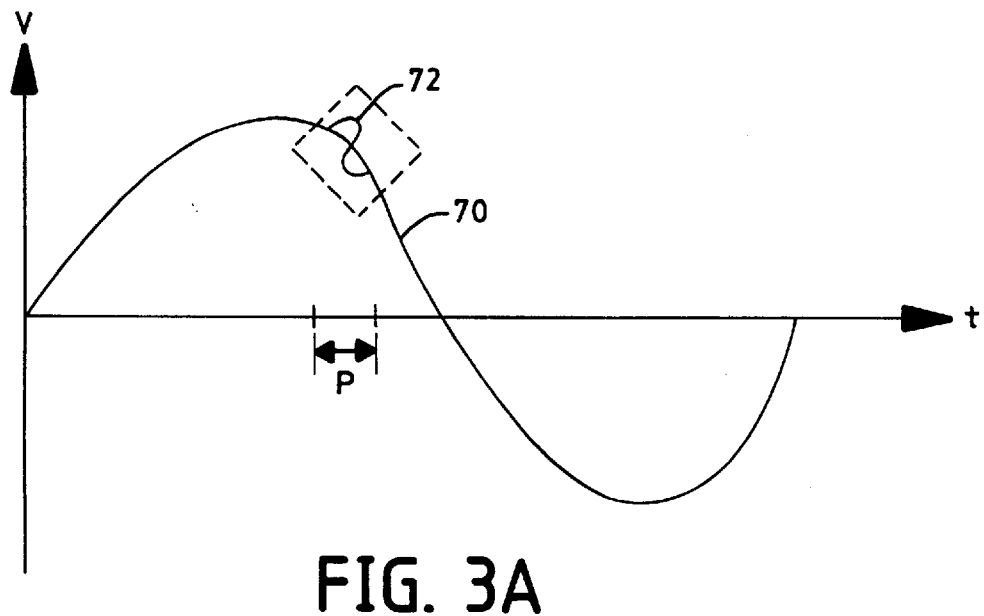
FIGS. 3A and 3B show a graph of a typical carrier wave and an encoding signal, respectively, as used by the invention.
Figure 3B:
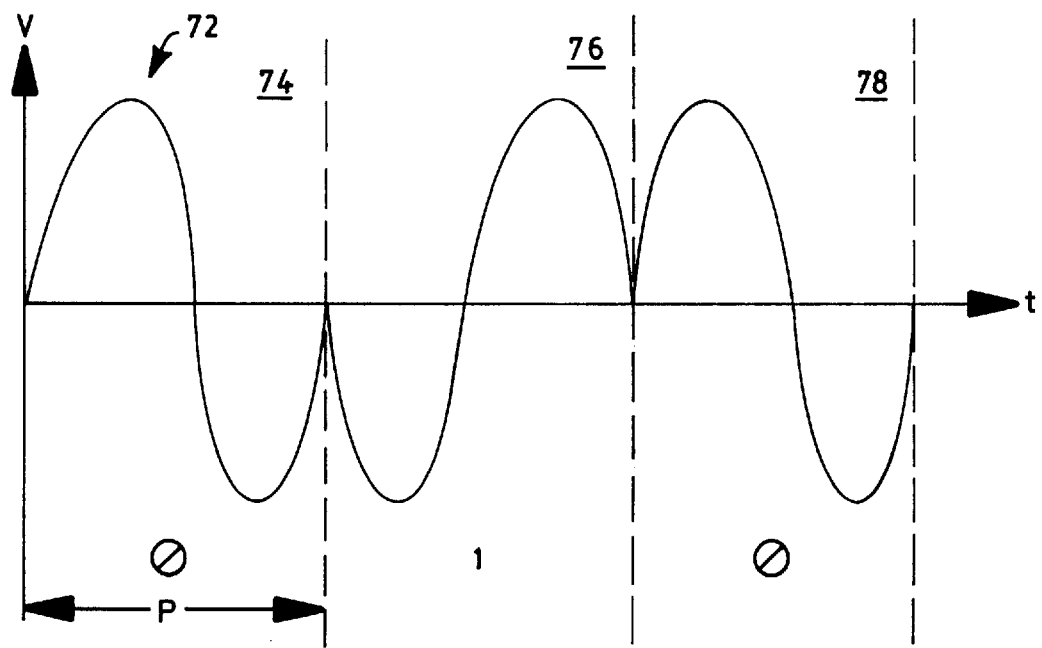

FIGS. 3A and 3B illustrate how the aforementioned information is encoded on the transmitted signal 14 by graphically depicting a carrier signal 70 and an encoded signal 72 thereon, respectively. The abscissa of the graph of the encoded signal 72 has units of time but also corresponds to the section 74 of the transmitted signal 14 enclosed by dashed lines in FIG. 3A. One skilled in the art will realize that the transmitted signal 14 is the summation of the carrier signal 70 and the encoded signal 72 and is drawn for optimum illustration and not waveform accuracy.

Phase shift keying is used in the preferred embodiment to encode the information into the encoded signal 72 and is described herein. One skilled in the art will realize that other forms of modulation and keying can be used to accomplish the encoding. For example, amplitude modulation of the carrier signal 70 can be used to transmit information from the car 10, and the transponder 20 can then encode using frequency shift keying. Various other combinations are also possible, such as using differential phase shift keying for example.

The carrier signal 70 is time segmented in intervals of duration P where each duration P designates a single bit of information. Therefore, the duration P is inversely proportional to a data rate of the communication system.

In the binary system of the preferred embodiment there are two phases defined where each corresponds to a logical zero or one. Region 74 shows an encoded signal 72 having no phase change, or a zero degree phase shift. This is defined for this example as a logical zero.

Region 76 shows the encoded signal 72 where a segment has been phase shifted by one hundred eighty degrees. The phase shift indicates a logical one. The frequency transition occurs after an end of an interval P thus allowing differentiation of consecutive zeroes or ones. The segment 72 of the transmitted signal 14 would then be decoded as the following logical sequence:

0 1 0

One skilled in the art will realize that other choices of phase changes can be used to define the binary system without detriment to the invention. Further, such an encoding method is amenable to encoding using systems of other bases. For example, ten phase changes could be defined to correspond to a decimal encoding system.

FIG. 4 shows a block diagram of a transponder 20. The transmitted signal 14 from the interrogator 10 is received by an antenna 80 and is passed to a tank and storage circuit 84. As previously described in the interrogator 10, a switch 82 is used to switch between receiving and transmitting modes. Alternatively, multiple antennas are used for continuous transmission and reception.

The tank and storage circuit 84 is tuned to receive a radio frequency transmission having a center frequency of the carrier signal 70. The energy transmitted by the transmitted signal 14 is stored until there is sufficient energy available to power the transponder circuitry. In the preferred embodiment, the energy is stored in a capacitor and over-voltage protection is provided to maintain the voltage within acceptable limits.

The level detect 86 monitors a voltage level in the tank and storage circuit 84 and allows propagation of the transmitted signal 14 once the voltage is sufficient.

The transmitted signal 14 is then passed to both a zero crossing detector 88 and an encoder 90. The zero crossing detector 88 monitors the transmitted signal 14 for zero crossings. Each time the voltage of the transmitted signal 14 passes through zero a toggle signal is sent to the encoder 90 and a sense of the transmitted signal. The sense is an indication of whether the signal is going positive or negative. In this way, the encoding is performed only on a predetermined portion of the transmitted signal. Thus, the transmitted signal can have information from the car 12 encoded on a top portion of the transmitted signal and the transponder 20 can then encode information only on the bottom portion, preserving the car's encoded information. Likewise, one skilled in the art will realize that peak detection, edge detection or various other methods can also be used to segregate the encoding signals.

When the encoder 90 receives the toggle signal from the zero crossing detector 88 indicative of the transmitted signal 14 going below zero volts, the encoder 90 begins placing a preprogrammed code on the transmitted signal 14. The code is stored in memory 92 and is fed to the encoder 90 to encode the transmitted signal to produce the retransmitted signal 22. In an embodiment having a static value for traffic signs, lane dividing lines, et cetera, the code is a 10-bit code burned into an erasable, programmable, read-only memory ("EPROM"), though a PROM, a ROM or other such device. In an alternative embodiment, the code is selectable or programmable. Selectable codes are used for devices having a limited, finite number of choices. For example, a traffic light would send one code indicating that the light is green, a second code indicating that the light is yellow, a third for red, and additional codes for other conditions such as flashing red, a green arrow, et cetera. Selectability can be achieved by an electrical input, appropriate for the traffic light example, or a set of dip switches on the transponder 20.

Other examples of transponders that transmit variable information are those attached to measuring devices. Sensors can be integrated with a transponder to inform vehicles of wind speed, moisture levels, ambient temperature, barometric pressure, et cetera.

Programmable codes are used for situations where the indication is non-standard or has such a large group of possible choices that it is impractical to make it selectable. Examples of non-standard indications are instructional signs, for example "PLYMOUTH ROCK NEXT RIGHT," street signs giving a name of a street, et cetera. These types of signs are generally programmed with alphanumeric codes where one code corresponds to a single alphanumeric character. Another example is an indicator used by a road construction crew. The crew could at various points wish to instruct traffic to detour, keep right, lower the speed limit, et cetera. Standard codes are then programmed into the transponder 20 or, if a standard code is not available, alphanumeric codes are used. One skilled in the art will realize that an external interface through a keyboard, serial link to a computer, or other such user interface would be provided for such programmability.

Another application of the invention is to provide the interrogator with financial information such that money transfers are accomplished electronically without requiring a user to exit the vehicle or even stop the vehicle. One method of accomplishing this task is to program the interrogator with bank account information. By way of example, the vehicle would then approach a toll booth and be informed of an amount of the toll that is being requested. The operator could then indicate acceptance by hitting a "PAY" key after which the account information is encoded by the interrogator onto the transmitted signal. The toll booth deciphers the account information and, subsequently, the account is debited by the amount of the toll. The vehicle would, of course, not have to stop to perform this transaction.

The toll booth example can, of course, be expanded to include any of various other transactions. For example, the vehicle goes to a fast-food restaurant for food. The oral request for payment from the order board could also be accompanied by an electronic request for payment. Hitting the "PAY" key then alleviates a need for a cash transaction, thus expediting the food receipt.

Another method of accomplishing this task is to place a credit/debit card reader in the vehicle. When the vehicle then comes to an establishment requesting payment, the card is inserted and the number is transmitted. Alternatively, the card number could also be recalled from a previous use or from keyed entry such that it need not be inserted each time a request for payment is requested.

The switch 82 is then switched to transmission mode and the retransmitted signal 22 is transmitted out of the antenna 80.

In an alternative embodiment, power is supplemented or externally supplied instead of being drawn from the carrier wave. Power supplementation in the preferred embodiment is provided by a solar cell in conjunction with a battery. The solar cell provides solar generated power as a primary supplement to the power supply of the transponder 20 with the battery used as an additional backup, thus extending battery life. The solar cell and the battery can be used interchangeably, supplemented or complemented by other power devices. For example, a thermopile could also be used to supplement the power supply from ambient heat.

External power is used when available but is not required. An example is that of the traffic light previously described. Power is tapped from the traffic signal since it is readily available.

In still another embodiment of the invention, the interrogator 10 is integrated with the sensory system of the vehicle. For example, the fuel gauge registers a low fuel indication, or simply falls below a predetermined amount. The interrogator 10 then "reads" a sign indicating there is a gas station ahead or the gas station ahead is the last for numerous miles, the interrogator could apprise the operator of the condition and suggest appropriate action.

In a further embodiment, the transponder 20 is a passive device as previously described, either with or without supplemental power input, but two transmission frequencies are used. A first transmission frequency is a substantially constant broadcast signal for supplying power to the transponder within a range of the transmitter. The second signal is the data signal which then corresponds to the transmitted signal 14 from a vehicle. In this way the first transmitted signal supplies a substantially constant power supply such that the data signal can be quickly processed and returned to the vehicle without significant delay.

Figure 5:
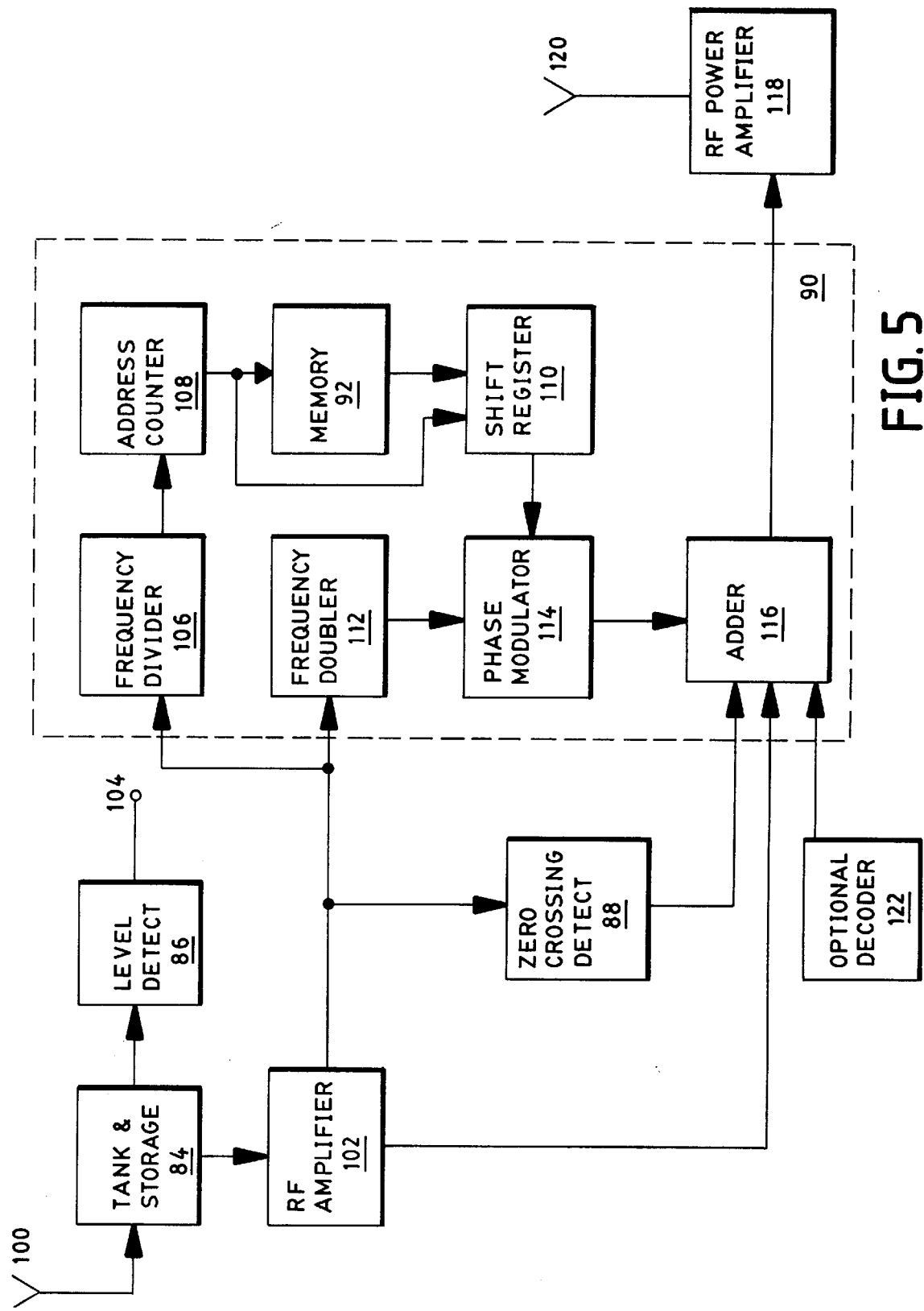
FIG. 5 shows a schematic diagram of the transponder of FIG. 4.

FIG. 5 illustrates the transponder 20 using multiple antennas for simultaneous receiving and transmission. This embodiment also details the encoding circuitry of the transponder 20.

The transmitted signal 14 is first received by an antenna 100 and passed to the tank and storage circuit 84. In the preferred embodiment, the tank circuit is a high Q circuit tuned to resonate at the RF center frequency. The RF voltage is rectified and charge is stored on a capacitor whose voltage is monitored by the voltage level detector 86.

When the voltage is sufficiently high, the level detector 86 flips an RF switch internal to the level detector 86, disconnecting the charging circuit and connecting the RF line to the RF amplifier 102. At this time, the voltage level detector block also emits a "power-on reset" (POR) signal 104 which resets the digital timing circuitry. The POR signal 104 is an input to many of the remaining blocks to reset those blocks. The lines to the blocks are not shown so as to simplify the diagram.

The RF amplifier 102 regenerates the RF signal to an amplitude sufficient to drive the subsequent circuitry. The amplified RF signal is next multiplied by the frequency multiplier 112 and divided down by the frequency divider 106.

Use of the frequency divider 106 is design specific and is generally required only if the carrier frequency is extremely high. The preferred embodiment is using a carrier wave with a center frequency of almost one gigahertz. Therefore, to reduce memory costs and at the same time increase receivability of the encoded information, each bit of encoded data is repeated by the transponder multiple times, ten for example. By doing so, slower memory can be used since new data from the memory is only necessary at a frequency of the center frequency divided by the amount of repetition. In this example, one gigahertz divided by ten is one hundred megahertz. Thus, slower memory can be used and the repetition allows the interrogator 10 to accurately decipher the code.

Besides simple redundancy, the increased data space can also be used for error detection. This can be accomplished in numerous ways such as prefacing and terminating each data bit with a predetermined code or convolving the code with a mask, for example.

The frequency divided RF signal is then used to clock the address counter 108 which was just reset to its starting value by the POR 104. The counter sequences the data out of the non-volatile memory 92 and into the shift register 110. One skilled in the art will realize the shift register 110 can be eliminated in which case the data and the memory contents would be buffered into the following stage.

Once the address counter 108 performs its sequencing, it ceases to clock the memory 92 until after the next POR 104, but it still continues to clock the shift register 110. In this way, power is not used to repeatedly readout the memory, and the shift register simply continues to cycle until the stored voltage, or $V_{CC}$, falls below a threshold of the level detector 86.

The data out of the shift register 110 is used to phase modulate the frequency multiplied signal. The frequency multiplier 112 performs a frequency multiplication on the carrier wave to generate a clock for the modulation signal, thus avoiding the necessity of an oscillator. Preferably, the amount of the multiplication has a bottom limit of at least twice the frequency of the carrier wave. This allows one full cycle of the modulation signal to be encoded onto a half cycle of the carrier wave. A greater multiplication factor is preferred and is limited only by the speed of the circuitry doing the encoding and, ultimately, the decoding.

The phase modulation is approximately one hundred eighty degrees to differentiate from a binary zero or one. This phase modulated signal is then added to the amplified RF signal in the adder 116 which adds the phase modulated signal to the amplified RF signal.

This addition is timed by the zero-crossing detector 88 so that the addition is performed at only the positive or negative half-cycle of the RF signal, in the preferred embodiment, the lower half-cycle. This permits encoding of the upper half cycle with data supplied by the interrogator 10.

After the addition is performed, the resulting signal is then amplified by a second RF power amplifier 118 and coupled to an antenna 120 for transmission as the retransmitted signal 22. In this embodiment, the frequency of the retransmitted signal 22 is not reduced. Thus, it is necessary to physically or electrically isolate, using polarization for example, the two antennas 100, 120, such that each does not interfere with the other.

An optional decoder 122 is shown, although the exact connections of its outputs depends on the circuit implementation. In general, the decoder could be used to instruct the transponder 20 to perform optional functions, permit two-way communications, or permit the incoming data to act as a "password" to enable or inhibit the transponder 20.

At this point it is likely evident that a predetermined protocol should be used such that the vehicle sending the transmitted signal can determine ownership upon detection. There are numerous possible ways to organize the signal and the actual content will vary by application. The following is a description of the arrangement on the preferred embodiment along with an explanation of the application. Also, a ten bit system is assumed. Redundancy will not be included in this description.

The transmitted signal is encoded by the interrogator on a positive half cycle of the carrier wave as follows:

| | |
|---|---|
| Start Flag | 10 bits |
| VIN | 100 bits |
| Vehicle data | 100 bits |
| Transmitted message | Variable |
| End Flag | 10 bits |

The start flag and the end flag indicate the beginning and end of transmission. Many possible flag combinations can be used such as alternating zeroes and ones, for example.

The VIN is the vehicle identification number of the vehicle. For cars this is a unique number that can be used to determine ownership of a signal. For example, once the transmitted signal is sent, a retransmitted signal must be received to garner useful information therefrom. If a signal is sent from car #1 and received by car #2, the distance to the transponder and the vehicle speed can not be attained. Further, it is not known whether that signal is conveying new information or information known previously, i.e., is the transponder indicating the set of lights that is already known or another set of lights ahead. Further, monitoring stations can then be used by law enforcement to monitor VIN's for stolen or wanted vehicles.

The vehicle data is a registration number and a speedometer reading. The registration number, in the preferred embodiment is used for vehicle identification for intervehicular communication as is later herein described. The speedometer reading is again for law enforcement so that police can monitor vehicle speeds without radar using manned or unmanned law enforcement stations. An example of how this could be used is as follows. The law enforcement station is placed on a side of a road and is either programmed with, or automatically determines the established speed limit for the area. As vehicles then pass, the law enforcement station monitors speed as transmitted from the vehicle. If the vehicle exceeds the speed limit the law enforcement station transmits a code for an electronic citation to the vehicle indicating that it has received a citation. The citation is then either transmitted to a central police station or stored for later download. A hard copy of the citation can then be mailed to the address of the owner of the vehicle and, if necessary, the citation can subsequently be enforced.

This speed determination can be made redundantly by using other speed ascertaining techniques in conjunction with that transmitted by the vehicle. An example of such a technique is monitoring field strength of the transmitted signal to determine distance to the vehicle and taking multiple samples to determine vehicle speed, again without indicating to the vehicle that it is been monitored.

The transmitted message is, again, for intervehicular communication. This can be voice or other data. Though a maximum packet size of two kilobits is used, this area is variable dependent upon the size of the message being sent.

Figure 6:
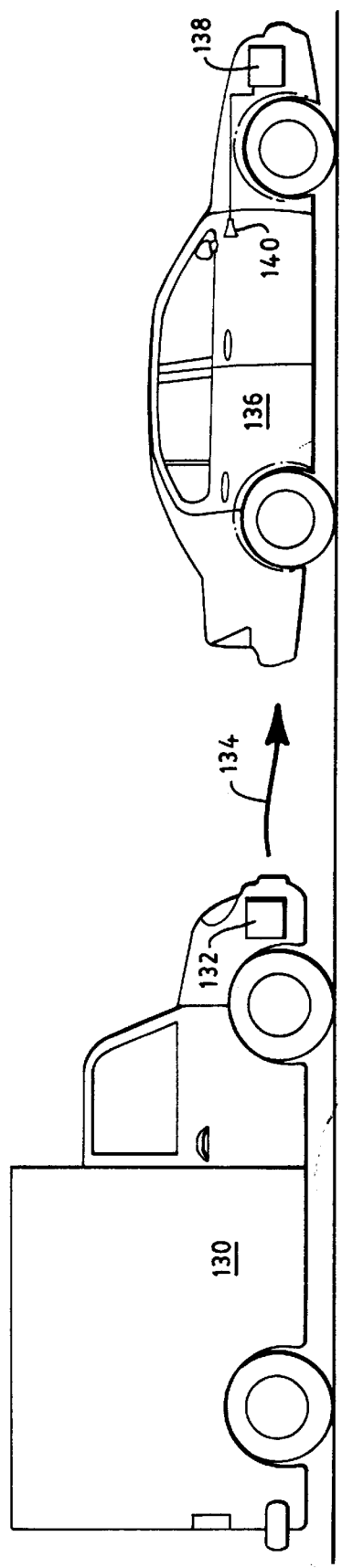
FIG. 6 shows a block diagram of an emergency vehicle using intervehicular communication in accordance with the invention.

FIG. 6 illustrates one form of intervehicular communication with respect to emergency vehicles. In the illustration an ambulance 130 uses an interrogator 132 to broadcast a transmitted signal 134 to a vehicle 136 in front of the ambulance. This broadcast could include a code receivable by the vehicle 136 indicating an urgent emergency broadcast and along with the message. The message could be a verbal message broadcast through a speaker 140 within the vehicle or tied directly into the car's stereo system.

This example can be expanded for bidirectional intervehicular communication. By adding a microphone to the vehicle's communication system, voice communications between vehicles is enabled. Using the previously described data organization system, an example of how this is performed is as follows. One vehicle initiates a call by keying into a keypad the registration number of another vehicle, vehicle #2. This can also be done using a voice recognition or other such input device. A voice or typed message is then transmitted on the transmitted signal to vehicle #2. Vehicle #2 receives the transmitted signal and recognizes its own registration number in the message. The message is then decoded and displayed or played through a speaker, as the case may be. The registration number of the sending vehicle, vehicle #1, is also included in the message so the operator of vehicle #2 need only hit a respond key to transmit a return message.

Figure 7:
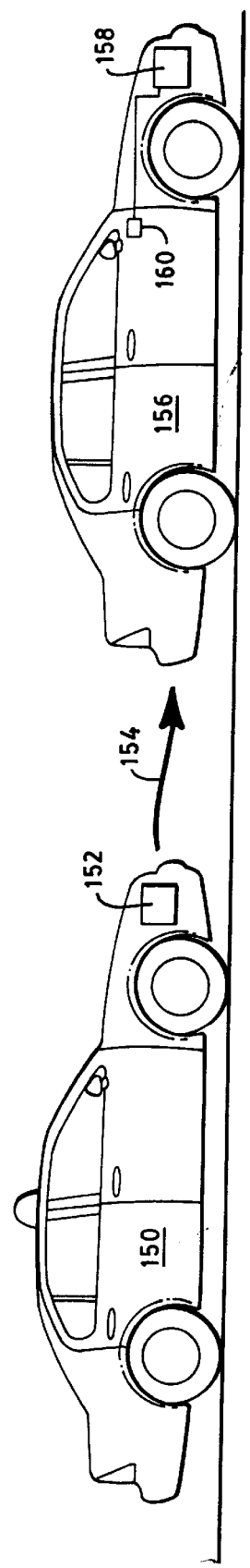
FIG. 7 shows a block diagram of intervehicular communication by a law enforcement vehicle in accordance with the invention.

FIG. 7 illustrates another form of intervehicular communication with respect to emergency vehicles. In the illustration a law enforcement vehicle 150 uses an interrogator 152 to transmit a transmitted signal 154 to a subject vehicle 156. The transmitted signal 154 in this case is directed toward a specific vehicle and, therefore, addresses the message by registration number or other such addressing code. In the case that the registration number is not known, the license plate has been removed for example, a transmitted signal from the subject vehicle 156 can be intercepted using methods well known in the art and the registration number can be withdrawn therefrom.

Once communication is established, the message from the law enforcement vehicle 150 can be presented by the subject vehicle's interrogator 158 to the operator of the subject vehicle 156. The message could be a verbal message to pull the car to the side of the road, for example.

Assuming that the message is ignored, the law enforcement vehicle can then issue a shutdown code in the transmitted signal 154 to force the subject vehicle 156 to stall, or shut down its engine. This shutdown code would cause an interrupter 160 to discontinue electrical energy from the subject vehicle's battery for example. The interrupter 160 can in practice be located at various points in the vehicle's electrical system, fuel system to discontinue fuel to the engine, or other vital systems of the subject vehicle 156.

The interrupter 160 is one possible method of remotely controlling the subject vehicle 156 using the invention. Since a vehicle equipped with the invention has a substantially constant knowledge of the vehicle's environment, assuming an infrastructure of transponders is in place, the vehicle can interface with the interrogator to operate the vehicle. For example, since the vehicle knows the distance to the stop sign, the placement of the road delineation lines, the speed limit, location and distance to other vehicles by monitoring the output signals of the other vehicles, inter alia, the vehicle can then operate without user input to guide the vehicle.

If the subject vehicle 156 is equipped with a fully autonomous embodiment of the invention, or auto-pilot system, the law enforcement vehicle 150 could then, instead of shutting the subject vehicle 156 down, simply direct the vehicle to pull to the side of the road and the subject vehicle would do so whether an occupant wished to comply or not.

Figure 8:
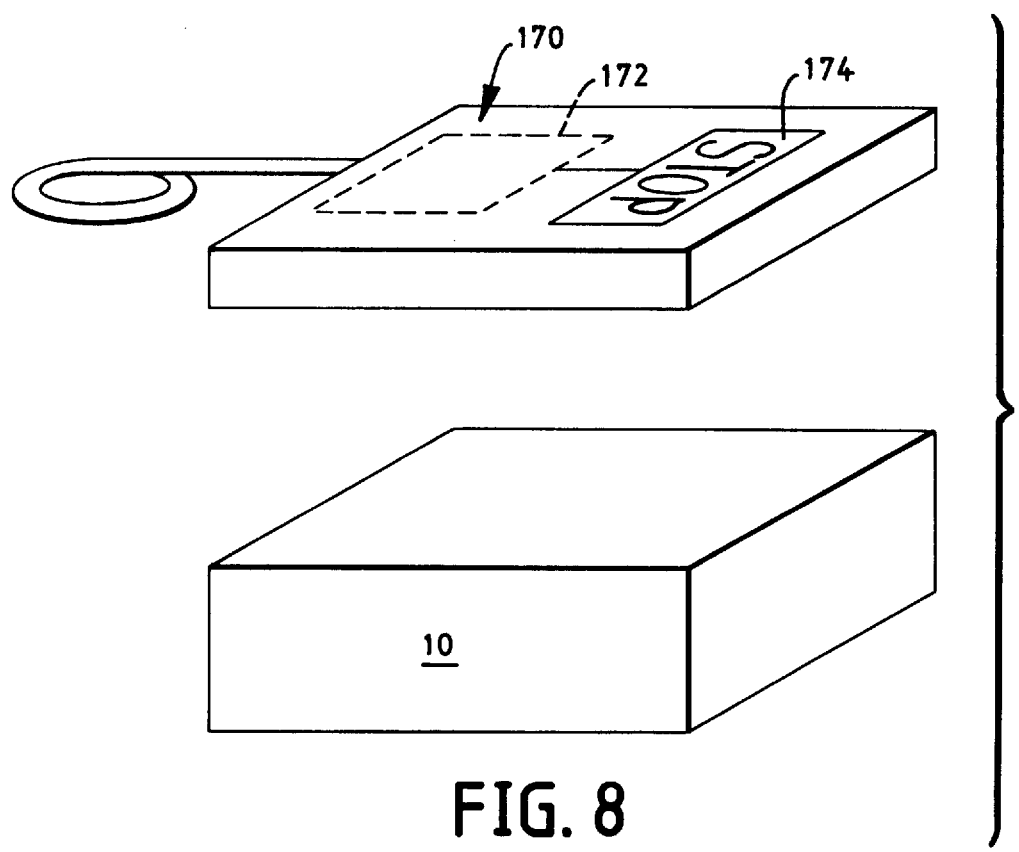
FIG. 8 shows a block diagram of a reader unit.

FIG. 8 shows an interrogator wand 170 having a compact interrogator 172 installed therein. The interrogator wand 170 is used for reading the coded contents of a transponder 10. For example, an installer wishes to know which of two transponders is coded with "ONE WAY", for example. The interrogator wand 170 is then held over the transponder 10. The interrogator 172 then reads and deciphers the code contained therein as previously described and displays the contents on a visual display 174.

While the applications described herein have in the examples been restricted primarily to cars and boats, the inventions has numerous other applications. For example, in surgical rooms constantly accounting for sponges is of great importance to avoid leaving a sponge within a patient. The invention can be used to alleviate such a problem. Since the code for a transponder could be simple in this application and the transmission distance would be short, the transponder could be simplified to be a very small ASIC. The transponder 10 would then be placed in the interior of each sponge. By waving the interrogator wand 170 over a patient, a doctor could be confident that no sponges remained within the patient.

Since the interrogator wand 170 is in either event either directly reading a code from a transponder 10 or looking for the presence of a transponder 10, the interrogator wand 170, in the preferred embodiment, is made for short range transmission and is highly directional. Applications can, of course, be found where these limitations are not helpful. But, for the two example cited, the directional nature helps locate the transponder 10 and the short range nature ensures that only the transponder 10 being interrogated will respond. Again in the preferred embodiment, the distance of the short range transmission is designed not to exceed one meter. Naturally the signal itself continues beyond that range but the power conveyed to a transponder beyond that range is insufficient to supply power to the transponder circuitry.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

The embodiments of the invention in which an exclusive property or privilege is claimed are defined as follows:

1. An intervehicular communication system for communicating between a first vehicle and a second vehicle having a first and second registration number, the intervehicular communication system comprising:

transmission means disposed in the first vehicle for transmitting a message to the second vehicle by addressing the message with the second registration number where the message has the first registration number disposed therein; and reception means disposed in the second vehicle for receiving the message and projecting the message to an operator of the second vehicle, the reception means further being adapted to store the first registration number upon receipt of the message to enable to return response to the message to the first vehicle without additional addressing by a user.

* * * * *